Sept. 10, 1974   D. L. SEIWERT ET AL   3,834,965

METHOD OF MAKING A LIGHTWEIGHT DUCT

Original Filed Jan. 29, 1969

United States Patent Office 3,834,965
Patented Sept. 10, 1974

3,834,965
METHOD OF MAKING A LIGHTWEIGHT DUCT
David L. Seiwert, West Chester, and Thomas L. Hampton, Loveland, Ohio, assignors to General Electric Company
Original application Jan. 29, 1969, Ser. No. 794,952, now Patent No. 3,757,827. Divided and this application Oct. 18, 1972, Ser. No. 298,634
Int. Cl. C09j 5/00; F16l 9/14
U.S. Cl. 156—294                                          4 Claims

ABSTRACT OF THE DISCLOSURE

A lightweight composite duct having inner and outer shells with a celluar core therebetween is provided with a mounting ring. The mounting ring is bonded to a split, wedge ring which, in turn, is bonded to the thin-walled inner shell of the duct. In fabrication, the inner shell is telescoped over a mandrel. The mounting ring is telescoped over the inner shell and defines a V-shaped groove. A strip of adhesive material is wrapped about the split, wedge ring, and the wedge ring is then forced into the V-shaped groove. A woven mesh material in the adhesive strip provides accurate spacing between the split, wedge ring and the shell and between the split, wedge ring and the mounting ring as the split, wedge ring flexes radially to provide essentially uniform adhesive thickness regardless of tolerance variations in the mounting ring and the inner shell. Thereafter, a honeycomb core is bonded to the inner shell, and an outer shell is bonded to the core and the mounting ring.

This is a divisional application of application Ser. No. 794,952, filed Jan. 29, 1969, now Pat. No. 3,757,827, and assigned to the assignee of the present invention.

The present invention relates to improvements in lightweight cylindrical structures in the nature of ducts, or the like, and to improvements in their fabrication.

The strength-to-weight advantages of composite structures are well recognized. A type of composite structure particularly suited for ducts, or the like, is formed by a core of honeycomb or other cellular material sandwiched between inner and outer sheet material shells. In order to mount such ducts, it is often necessary or desirable to provide solid rings as an integral part of the composite duct structure. Bolts can then be used in the ring portion to mount the duct in whatever structure it is employed.

In large diameter ducts, it is particularly difficult to attach solid rings to the composite duct structure and obtain the necessary strength at the point of attachment. This problem is attributable to the fact that the sheet material shells of the composite material must be adhesively bonded to at least one of the shells with an essentially uniform annular bonding area in order to obtain a uniform distribution of stresses in the thin shell material. Adhesive materials suitable for such bonding require an essentially uniform film thickness between the bonded surfaces to obtain suitable strength. Maintaining manufacturing tolerances in large diameter rings and shells to obtain controlled spacing for the adhesive film is both difficult and expensive.

A further problem is found in maintaining the desired axial position of a ring when bonding it to a tapered duct since the radial clearance for the adhesive film varies as a function of axial position.

The same problems exist where mounting flanges must be attached to thin-walled cylindrical shells which are not components of composite ducts, as for example, rocket casings which may also be considered lightweight ducts.

The object of the present invention is to overcome the problems of attaching mounting rings to lightweight ducts, or the like, and particularly to composite lightweight ducts.

The above ends are attained by telescoping a mounting ring into registration with a circumferential band portion of a thin-walled cylindrical shell which may be a portion of a composite duct. The mounting ring and shell, in combination, form a V-shaped annular groove, one leg of which is defined by the band portion of the shell and the other leg of which is defined by a surface of the mounting ring. The groove-defining surface of the thin shell is supported to prevent its deflection away from the mounting ring. Split, wedge ring means, of substantially 360° angular extent, are inserted into the V-shaped groove with adhesive disposed between the wedge means and the groove. Sufficient pressure is applied to the wedge ring means so that they are radially displaced, and essentially uniform film thickness is obtained between the wedge ring means and the shell, as well as between the wedge ring means and the mounting ring, thereby attaching the mounting ring to the shell.

Preferably shim means are employed to positively space the wedge ring means relative to the groove as the wedge ring means are flexed under pressure.

It is further preferred, in forming a composite duct, to thereafter bond cellular material to the outer surface of the shell and then bond a second shell to the cellular material and to the mounting ring to form a composite duct having a highly reliable, high strength mounting ring attached thereto.

The above and other related objects and features of the invention will be apparent from a reading of the following description of the disclosure found in the accompanying drawing and the novelty thereof pointed out in the appended claims.

Figure 1:
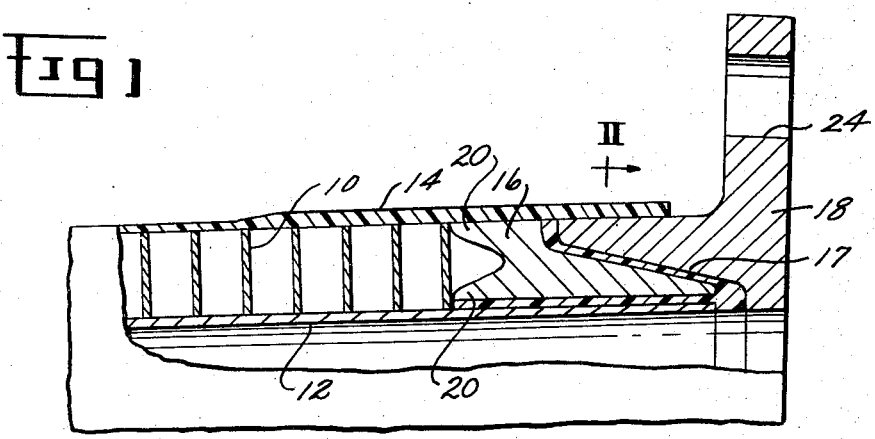
FIG. 1 illustrates a composite duct, with portions broken away, embodying the present invention.
Figure 2:
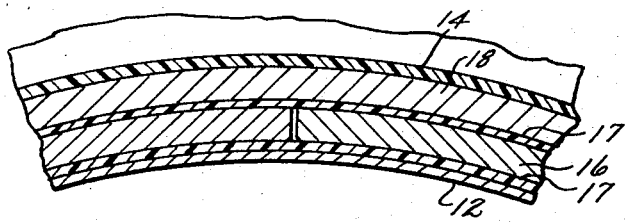
FIG. 2 is a section, taken on line II—II in FIG. 1.

The duct seen in FIGS. 1 and 2 comprises a metal honeycombed, cellular core 10 sandwiched between an inner shell 12 and an outer shell 14. The shells 12 and 14 are bonded to the core 10. This type of a sandwich composite structure is, per se, well known and provides many obvious advantages because of its high strength-to-weight ratio.

Preferably the inner shell 12 is formed of thin sheet metal and the outer shell 14 is formed of fiber glass-reinforced resin, as for example, one of the well-known epoxy resins.

A mounting ring 18 forms a V-shaped groove in combination with a circumferential band portion of the inner shell 12. A split, wedge ring 16 is bonded in this groove by adhesive 17 having an essentially uniform film thickness. The outer shell 14 is bonded to both the split, wedge ring 16 and mounting ring 18. The wedge ring has thin extensions 20 directed toward the core 10 to minimize stress concentrations where the shells 12 and 14 extend beyond the core 10 and are bonded to the wedge ring.

The described structure provides a high strength attachment between the ring 18 and the remainder of the composite duct, by reason of the fact that there is an accurately controlled thickness film of adhesive between the ring 16 and shell 12, as well as between the ring 16 and the ring 18. Holes 24 are provided in the outwardly projecting flange of the ring 18 to enable the duct to be mounted on whatever structure it is to form a part. With the described structure maximum strength is provided in mounting the duct. The opposite end of the duct would be similarly formed if it were to have a connection with some other part of the machine or structure.

Figure 3:
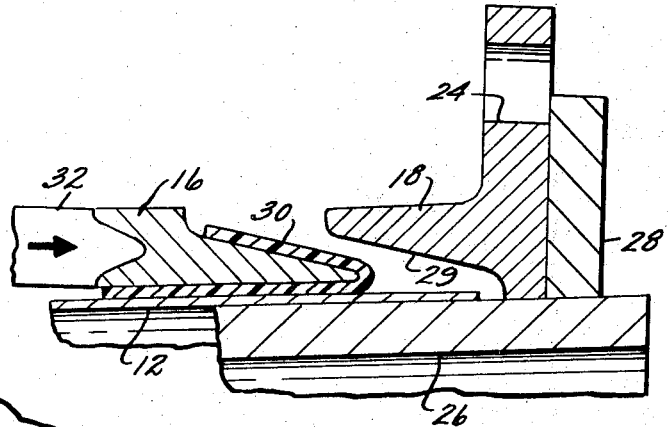
FIG. 3 is a section showing a step in the method of fabricating this duct.
Figure 4:
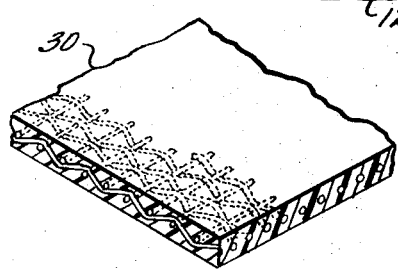
FIG. 4 is a fragmentary view, on an enlarged scale, of bonding material employed in forming the duct.

The controlled adhesive film thickness is obtained initially by placing the inner shell 12 on a corresponding tapered mandrel 26 (FIG. 3). The mounting ring 18 is then positioned, by an adjustable stop ring 28, the correct axial distance from the end of the inner shell 12. It will be seen that the shell 12 and mounting ring 18 form a circumferential V-shaped groove 29. The wedge ring 16 is split, as mentioned above. Preferably it is split into two halves, together having an angular extent of just under 360°, herein referenced as substantially 360°. The wedge ring halves are positioned, as illustrated in FIG. 3, with strips of adhesive material 30 wrapped over their wedge portions. The strips of material 30 (FIG. 4) are, advantageously, a partially cured resin, as for example, epoxy resin, cured to the B stage, having an open, mesh cloth impregnated therein. With the split, wedge ring 16 so positioned, plungers 32 force it into the V-shaped groove, providing a uniform circumferential pressure distribution.

Sufficient pressure is employed to compress the strip 30 until the surfaces to be bonded are separated only by the thickness of the mesh cloth. Since the split, wedge ring 16 is free to be displaced in a radial sense as it is displaced axially, such displacement achieves the uniform spacing between the surfaces to be bonded by the adhesive. The bonding cycle would be completed, after the film thickness had been obtained, in accordance with the necessary procedure for whatever resin is selected.

It will be apparent that the described method of fabrication can accommodate relatively large tolerance variations in the diameter of the inner shell 12, as well as in the diameters of the mounting ring 18. First, the shell 12 can be seated on the conical mandrel 26 in a wide range of positions to provide a firm backing, preventing its displacement away from the mounting ring during application of pressure in the fashion described. Secondly, the stop 28 is adjusted to correctly position the ring in the desired axial position relative to the shell 12 (and the resultant composite duct). The split, wedge ring is forced a variable axial distance necessary to obtain a controlled film thickness of the adhesive film, this being obtained regardless of variations in the outer diameter of the shell 12 or variations in the outer diameter of the tapered bonding surface of the mounting ring.

After joining the inner shell, the split ring 16, and the mounting ring 18 as described above, the honeycomb core 10 is then bonded to the outer surface of the inner shell 12. Thereafter the outer shell 14 is bonded to the core 10. Preferably the outer shell 14 is formed of a fiber-reinforced resin which is cured after being wrapped around the core 10 so that the structural integrity of the shell is obtained simultaneously with bonding it to the core, as well as to the rings 16 and 18.

If the duct were formed as a straight cylinder rather than as the tapered cylinder illustrated, the mandrel 26 would be expansible in order to obtain firm backing for the inner shell 12 as it is bonded to the rings 16 in the fashion described.

It will be appreciated that the mesh cloth in the adhesive strip 30 provides a shimming function in maintaining the desired adhesive film thickness. While this approach is preferable, other shimming means could also be employed, as for example, by providing spacing buttons on the wedge surfaces of the split ring 16 which are to be bonded to the shell 12 and ring 18. Also, it is to be noted that there are other types of adhesives obtainable in strip form which bond at pressures sufficiently high that the ring 16 will be displaced into the desired space relationship without the need of shimming means.

It will further be noted that the described method produces a novel and useful article once the mounting ring 18 is attached to the inner shell 12. That is, in certain instances, the core 10 and outer shell 14 can be omitted, to provide a lightweight duct, or the like, having a high strength mounting flange.

Because of these and other variations in the preferred embodiment and method of practicing the present invention, the scope of the inventive concepts is to be derived solely from the following claims.

Having thus described the invention, what is claimed as novel and desired to be secured by Letters Patent of the United States is:

1. A method of forming lightweight ducts, or the like, comprising the steps of,
   telescoping a mounting ring into registration with a circumferential band portion of a thin-walled cylindrical shell to form a V-shaped annular groove, one leg of which is defined by the band portion of the shell and the other leg of which is defined by a surface of the mounting ring,
   supporting said shell to prevent deflection of its groove surface away from said mounting ring,
   inserting split, wedge ring means, of substantially 360° angular extent, into said V-shaped groove with adhesive and shim means disposed between said wedge means and said groove,
   applying sufficient pressure to said wedge ring means to radially displace same, said shim means limiting the movement of said wedge ring means to obtain essentially uniform adhesive film thickness between said wedge ring means and said shell as well as between said wedge ring means and said mounting ring, as determnned by the thickness of said shim means, and
   curing said adhesive to attach said mounting ring to said shell.

2. A method as in claim 1 wherein,
   the shim means are so disposed by wrapping a strip of adhesive having a woven mesh cloth therein around the wedge portions of the split ring means prior to inserting the wedge means in the groove, thereby providing said shim means when the strip is compressed, upon application of pressure to said wedge ring means.

3. A method as in claim 1 further comprising the steps of,
   bonding a cellular core to one surface of the shell, and
   bonding a second shell to the core to form a composite duct.

4. The method of claim 3 comprising the steps of,
   telescoping the thin-walled cylindrical shell over a mandrel to provide support for the shell during the application of pressure to the wedge ring means and to form the shell as the inner shell of the composite duct, and further
   inserting wedge ring halves into said V-shaped grooves.

References Cited
UNITED STATES PATENTS

| | | | |
|---|---|---|---|
| 2,496,402 | 2/1950 | McVeigh et al. | 285—55 X |
| 2,882,072 | 4/1959 | Noland | 285—114 |
| 2,998,269 | 8/1961 | Houghton | 285—260 |
| 3,002,770 | 10/1961 | Chesnut et al. | 285—94 |
| 3,007,203 | 11/1961 | Ammons | 264—48 |
| 3,482,125 | 12/1969 | Fleckenstein | 156—313 X |
| 3,496,964 | 2/1970 | Thomas et al. | 138—109 |

FOREIGN PATENTS

| | | |
|---|---|---|
| 1,097,220 | 1/1961 | Germany. |

CHARLES E. VAN HORN, Primary Examiner

R. A. DAWSON, Assistant Examiner

U.S. Cl. X.R.

138—109, Digest 9; 156—295, 303.1, 309, 313; 161—88, 139; 285—55, 112, 149, 235, 260, 296, 339, 421